(12) United States Patent
Kikinis

(10) Patent No.: US 7,562,157 B2
(45) Date of Patent: Jul. 14, 2009

(54) SIMPLIFIED-FILE HYPER TEXT PROTOCOL

(75) Inventor: Dan Kikinis, Saratoga, CA (US)

(73) Assignee: Inpro Licensing Sarl, Luxembourg (LU)

( * ) Notice: Subject to any disclaimer, the term of this patent is extended or adjusted under 35 U.S.C. 154(b) by 725 days.

(21) Appl. No.: 10/862,725

(22) Filed: Jun. 7, 2004

(65) Prior Publication Data

US 2005/0182827 A1 Aug. 18, 2005

Related U.S. Application Data

(60) Division of application No. 10/364,960, filed on Feb. 12, 2003, now abandoned, which is a continuation of application No. 09/506,107, filed on Feb. 17, 2000, now Pat. No. 6,535,922, which is a division of application No. 08/791,249, filed on Jan. 30, 1997, now Pat. No. 6,076,109, which is a continuation-in-part of application No. 08/629,475, filed on Apr. 10, 1996, now Pat. No. 5,727,159.

(51) Int. Cl.
*G06F 13/00* (2006.01)
(52) U.S. Cl. ...................................... 709/246; 709/232
(58) Field of Classification Search ................. 709/246, 709/232, 236, 230, 234, 203
See application file for complete search history.

(56) References Cited

U.S. PATENT DOCUMENTS

| | | | |
|---|---|---|---|
| 4,039,999 A | 8/1977 | Weston | 367/132 |
| 4,821,121 A | 4/1989 | Beaulier | 358/160 |
| 5,150,031 A | 9/1992 | James et al. | 320/164 |
| 5,159,592 A | 10/1992 | Perkins | 370/338 |
| 5,251,329 A | 10/1993 | Takagi et al. | 455/572 |
| 5,315,693 A | 5/1994 | Hirosawa | 395/128 |
| 5,325,362 A | 6/1994 | Aziz | 370/405 |
| 5,367,556 A | 11/1994 | Marui et al. | 455/569 |
| 5,379,340 A | 1/1995 | Overend et al. | 379/93 |

(Continued)

FOREIGN PATENT DOCUMENTS

EP  0 361 464 A2  4/1990

(Continued)

OTHER PUBLICATIONS

Abrams, Marc et al., "Caching Proxies: Limitations and Potentials" pp. 1-15, Oct. 7, 1995.

(Continued)

*Primary Examiner*—Kenneth R Coulter
(74) *Attorney, Agent, or Firm*—The Marbury Law Group PLLC

(57) ABSTRACT

A system is provided wherein relatively low-end computers, such as portable, battery-powered computers ordinarily incapable of sophisticated Internet browsing functions may be used to browse the Internet. The enhanced computing ability for such portables is provided by a unique Internet server adapted for transposing data files to alternative, low-information-density form, preferably comprising simplified or single files suitable for rapid processing and display by connected portable and other low-end computers In embodiments wherein batter-powered field units are used, battery life is exhibited far beyond what would be expected for a battery-powered computer with computing power for browsing the Internet directly. In some embodiments of the invention adapted files are saved and identified for future use in communicating with specific devices over Internet connections.

13 Claims, 8 Drawing Sheets

U.S. PATENT DOCUMENTS

| | | | |
|---|---|---|---|
| 5,493,692 A | 2/1996 | Theimer et al. | 455/26.1 |
| 5,530,852 A | 6/1996 | Meske, Jr. et al. | 709/206 |
| 5,533,174 A | 7/1996 | Flowers et al. | 358/1.15 |
| 5,548,727 A | 8/1996 | Meehan | 709/221 |
| 5,564,070 A | 10/1996 | Want et al. | 455/507 |
| 5,572,528 A | 11/1996 | Shuen | 370/402 |
| 5,572,643 A | 11/1996 | Judson | 709/218 |
| 5,586,260 A | 12/1996 | Hu | 713/201 |
| 5,613,148 A | 3/1997 | Bezviner et al. | 709/203 |
| H1641 H | 4/1997 | Sharman | 370/338 |
| 5,623,600 A | 4/1997 | Ji et al. | 713/201 |
| 5,627,829 A | 5/1997 | Gleeson et al. | 370/230 |
| 5,636,217 A | 6/1997 | Moelard | 370/338 |
| 5,678,041 A | 10/1997 | Baker et al. | 707/9 |
| 5,680,129 A * | 10/1997 | Weinberger et al. | 341/65 |
| 5,696,898 A | 12/1997 | Baker et al. | 713/201 |
| 5,701,451 A | 12/1997 | Rogers et al. | 707/1 |
| 5,706,427 A | 1/1998 | Tabuki | 713/201 |
| 5,706,507 A | 1/1998 | Schloss | 707/104.1 |
| 5,710,883 A | 1/1998 | Hong et al. | 709/246 |
| 5,727,159 A | 3/1998 | Kikinis | 709/246 |
| 5,737,619 A | 4/1998 | Judson | 707/500 |
| 5,742,598 A | 4/1998 | Dunn et al. | 455/54.2 |
| 5,748,897 A | 5/1998 | Kativar | 709/219 |
| 5,754,938 A | 5/1998 | Herz et al. | 725/116 |
| 5,754,939 A | 5/1998 | Herz et al. | 455/3.04 |
| 5,758,078 A | 5/1998 | Kurita et al. | 709/203 |
| 5,764,235 A * | 6/1998 | Hunt et al. | 345/428 |
| 5,768,528 A | 6/1998 | Stumm | 709/231 |
| 5,774,670 A | 6/1998 | Montulli | 709/227 |
| 5,781,550 A | 7/1998 | Templin et al. | 370/401 |
| 5,790,789 A | 8/1998 | Suarez | 709/202 |
| 5,790,960 A | 8/1998 | Miyashita | 455/572 |
| 5,796,952 A | 8/1998 | Davis et al. | 709/224 |
| 5,805,803 A | 9/1998 | Birrell et al. | 713/201 |
| 5,809,415 A | 9/1998 | Rossman | 455/422 |
| 5,812,865 A | 9/1998 | Theimer et al. | 709/228 |
| 5,826,025 A | 10/1998 | Gramlich | 709/217 |
| 5,835,789 A | 11/1998 | Ueda et al. | 710/33 |
| 5,870,549 A | 2/1999 | Bobo, II | 709/206 |
| 5,873,045 A | 2/1999 | Lee et al. | 455/550 |
| 5,892,767 A | 4/1999 | Bell et al. | 370/432 |
| 5,897,644 A | 4/1999 | Nielsen | 707/513 |
| 5,907,815 A | 5/1999 | Grimm et al. | 455/557 |
| 5,912,697 A * | 6/1999 | Hashimoto et al. | 725/114 |
| 5,918,013 A | 6/1999 | Mighdoll et al. | 709/217 |
| 5,953,506 A | 9/1999 | Kalra et al. | 709/231 |
| 6,014,701 A | 1/2000 | Chaddha | 709/226 |
| 6,023,714 A | 2/2000 | Hill et al. | 707/513 |
| 6,073,033 A | 6/2000 | Campo | 455/566 |
| 6,073,176 A | 6/2000 | Baindur et al. | 709/227 |
| 6,076,109 A | 6/2000 | Kikinis | 709/228 |
| 6,085,247 A | 7/2000 | Parsons, Jr. et al. | 709/227 |
| 6,125,285 A | 9/2000 | Chavez et al. | 455/557 |
| 6,128,649 A | 10/2000 | Smith et al. | 709/217 |
| 6,154,778 A | 11/2000 | Koistinen et al. | 709/228 |
| 6,167,469 A * | 12/2000 | Safai et al. | 710/62 |
| 6,195,366 B1 | 2/2001 | Kayashima et al. | 370/475 |
| 6,233,017 B1 * | 5/2001 | Chaddha | 375/240.12 |
| 6,243,392 B1 | 6/2001 | Uemura et al. | 370/465 |
| 6,243,596 B1 | 6/2001 | Kikinis | 455/572 |
| 6,253,241 B1 | 6/2001 | Chaddha | 709/223 |
| 6,324,648 B1 | 11/2001 | Grantges, Jr. | 713/201 |
| 6,339,794 B2 | 1/2002 | Bolosky et al. | 709/233 |
| 6,341,133 B1 | 1/2002 | Kawamoto et al. | 370/401 |
| 6,587,885 B1 * | 7/2003 | Nakayama et al. | 709/236 |
| 2001/0002851 A1 | 6/2001 | Shimada et al. | |
| 2001/0041053 A1 * | 11/2001 | Abecassis | 386/83 |

FOREIGN PATENT DOCUMENTS

| | | |
|---|---|---|
| EP | 0 483 547 A1 | 5/1992 |
| EP | 0 537 756 A2 | 4/1993 |
| EP | 0 747 844 A1 | 12/1996 |
| EP | 0 768 806 A3 | 4/1997 |
| EP | 0 811 939 A2 | 12/1997 |
| JP | 57-174769 | 10/1982 |
| JP | 63-086655 | 4/1988 |
| JP | 1-302472 | 12/1989 |
| JP | 3-63745 | 3/1991 |
| JP | 3-75954 | 3/1991 |
| JP | 3-280154 | 12/1991 |
| JP | 5-216800 | 8/1993 |
| JP | 5-274229 | 10/1993 |
| JP | 5-274424 | 10/1993 |
| JP | 5-324527 | 12/1993 |
| JP | 6-52119 | 2/1994 |
| JP | 6-103189 | 4/1994 |
| JP | 6-205049 | 7/1994 |
| JP | 7-30672 | 1/1995 |
| JP | 07 168 781 | 7/1995 |
| JP | 8-6875 | 1/1996 |
| JP | 8-204703 | 8/1996 |
| JP | 9-16487 | 1/1997 |
| JP | 10-21165 | 1/1998 |
| WO | WO 95/10150 | 4/1995 |
| WO | WO 96/17460 | 6/1996 |
| WO | WO 96/23265 | 8/1996 |
| WO | WO 97/22201 | 6/1997 |
| WO | WO 97/26724 | 7/1997 |
| WO | WO 97/35402 | 9/1997 |
| WO | WO 97/46943 | 12/1997 |

OTHER PUBLICATIONS

Chikarmane et al., Mobile IP-based Multicast as a service for Mobile Hosts, pp. 11-18, IEEE, 1995.

"Cyberscope—Hot Property—A Smart Phone Gets Smarter" (1 page) from Newsweek (USA) Feb. 22, 1999.

Fox, Armando et al., "Reducing WWW Latency and Bandwidth Requirements by Real-Time Distillation" from the 5$^{th}$ International WWW Conference, May 6-10, 1996 Paris, France pp. 1 to 13.

Fox A., et al., "Reducing WWW latency and bandwidth requirements by real-time distillation" Computer Networks and ISDN Systems, Elsevier Science BV vol. 28, 1996 p. 1445-1456.

Gessler, S. et al. "PDAs as Mobile WWW Browsers" Computer Networks and ISDN Systems, Elsevier Science BV vol. 28, No. 1, 1995, p. 53-59 XP004001210.

GloMop: Global Mobile Computing by Proxy Position Paper, Sep. 13, 1995, p. 1-12 XP002094009 (http://www.cs.berkely.edu/~fox/glomop/glomop_posn.ps.

Imielinski, Tomasz et al, "Mobile Computing" (2 pages) Jan. 1996.

Kawamata, Y. Internet Technique in the Multimedia Era, Interface, CQ Publishing Company, Sep. 1, 1995, vol. 21, No. 9, p. 151-166.

Perkins, Charles E. Simplified Routing for Mobile Computers Using TCP/IP, p. 7-13, IEEE, 1992.

Qu et al., A Practical Method for Achieving Portable Communications in the Internet Context, pp. 1512-1516, IEEE, 1995.

Simpson, W., I Png Mobility Considerations, Network Working Group, pp. 1-9, Aug. 1994.

Tanenbaum, Structured Computer Organization, Prentice Hall, pp. 10-12 (1984).

Watson, Terri "Application Design for Wireless Computing" Proceedings Workshop on Mobile Computing Systems and Applications, (CAT. No. 94TH06734) Santa Cruz, CA Dec. 8-9, 1994 (1995 IEEE pp. 91-94).

Williams, T. "Embedded Oss Hustle to Support Networked Devices" Electronic Design vol. 45, No. 11, May 27, 1997 pp. 113,114-116.

Yang, Oliver et al., Modeling and Performance Analysis of File Transfer in a Satellite Wide Area Network; IEEE Journal on Selected Areas in Communications, vol. 10, No. 2, pp. 428-436 Feb. 1992.

Zenel, Bruce et al., "Intelligent Communication Filtering for Limited Bandwith Environments" from the Computer Science Department of Columbia University, Proceedings Fifth Workshop on Hot Topics in Operating Systems (HOTOS-V) (CAT.No. 95$^{TH}$8059) Orcas Island, WA USA May 4-5, 1995 p. 28-34 XP002094011.

Brooks, C. et al., "Application-Specific Proxy Servers as HTTP Stream Transducers", www.w3.org/conferences/WWW4/Papers/56/, Feb. 6, 2002, 1-11.

Courtois, T. et al., "A PDA-to-World-Wide-Web Interface", *PDA Developers*, Jan./Feb. 1995, 3.1, 1-3.

Bartlett, J.F., "experience with a Wireless World Wide Web Client", *IEEE*, 1995, 154-157.

Rupley, S., "Web Terminals Take Shape", *PC Magazine Online*, www.zdnet.com/pcmag/issues/1504/pcm0015.htm, 1996, 1-3.

"AT & T's Internet Phone Becomes Official", *PC Magazine Online*, www.zdnet.com/pcmag/news/trends/t960716a.htm, 1996, 1-2.

"Netscape Backs Navio", *PC Magazine Online*, 1996, www.zdnet.com/pcmag/news/trends/t960826a.htm, 1-3.

Gralla, P., How Network Computers (NCs) Work, How the Internet Works, 1997, 14, 1-8.

Unknown, XHTML™ 1.0: The Extensible HyperText Markup Language, www.w3.org/TR.xhtml1, 2000, all pages.

Bartlett, J.F. "Experience with a Wireless World Wide Web Client", *WRL Technical Note*, Mar. 1995, 1-13.

Le, My T. et al., "InfoNet: the Networking Infrastructure of Infopad" *Proceedings of Compcon*, Mar. 1995, 1-6.

Wang, R. et al., "A Multimedia File Structure for Continuous and Discrete Media", *Canadian Conference on Electrical and Computer Engineering*, 1993, 644-647.

Rothermel, K. et al., "QoS Negotiation and Resource Reservation for Distributed Multimedia Applications", *Proc. IEEE International Conference on Multimedia Computing and Systems*, 1997, 319-326.

Megzari, O. et al., "A Distributed Platform for Interactive Multimedia", *Canadian Conference on Electrical and Computer Engineering*, 1994, 755-758.

Hahn, H. et al., The Internet Complete Reference, *Osborne/McGraw Hill*, 1994, 24 501-507.

Schulzrinne, H., "World-Wide Web: Whence, Whither, What Next?", *IEEE Network Magazine*, Mar./Apr. 1996, 1-14.

* cited by examiner

SIMPLIFIED-FILE HYPER TEXT PROTOCOL

CROSS REFERENCE TO RELATED APPLICATIONS

The present application is a divisional of U.S. patent application Ser. No. 10/364,960 filed Feb. 12, 2003 now abandoned, which is a continuation of U.S. patent application Ser. No. 09/506,107 filed Feb. 17, 2000, now U.S. Pat. No. 6,535,922, which is a divisional of U.S. patent application Ser. No. 08/791,249 filed Jan. 30, 1997 now U.S. Pat. No. 6,076,109, which is a continuation-in-part of U.S. application Ser. No. 08/629,475 filed Apr. 10, 1996 now U.S. Pat. No. 5,727,159.

FIELD OF THE INVENTION

The present invention is in the area of apparatus and methods including software for accessing information from the Internet, and providing the accessed information to an end user. The invention has, in various embodiments, particular applicability to portable computers powered by batteries and the like used as field units for Internet access.

BACKGROUND OF THE INVENTION

There are many motivations to computer development, depending largely on targeted customer groups. For example, a certified public accountant needs to run applications having to do with accounting, taxes, financial planning, and the like, while a fiction writer may wish only to use a computer as a word processor. The kind of system one of these people might choose to own may be vastly different from the type the other would purchase. Manufacturers plan their research and development to produce products that appeal to their targeted customer bases.

Even with the considerable differences in needs between different consumer groups, there are still many commonly desirable traits in computer development. For example, regardless of the ultimate functionality of a particular sort of computer, a low cost to manufacture is a desirable characteristic. Another desirable characteristic is portability. There are advantages to being able to easily move one's computing tool from place to place, and even greater advantages to having a portable computer small enough to carry in a pocket or purse.

Even though portability and small size is generally desirable, power and functionality are always desirable as well, and these characteristics are competitive. Conventionally and historically one pays a penalty for small size and portability.

One of the penalties typically paid is functionality as related to battery life. That is, if one uses a powerful and fast CPU in a portable computer, the size of the battery must be quite large, and life between charges will be relatively short. For example, it can be shown in general that 100 grams of battery weight, fully charged, will power about $5 \times 10^8$ instructions. It is to be understood that this is a general figure, and may vary somewhat for different CPUs, types of batteries, and the like.

Given the figure above relating battery weight to a number of instructions for illustrative purposes, if a portable computer is to be provided with ability to execute relatively high-overhead applications, such a HTML files in Internet applications, the CPU for the portable computer will have to operate at 1 to 2 MIPS (million instructions per second). Assuming 1 MIPS, a battery weight of 100 g. will discharge in about 8 minutes. A five hundred gram (a little over one pound) battery will provide a life between charges of about 41 minutes.

It is seen, then, that as applications and desired functions for personal computers become more sophisticated, it becomes ever more difficult to provide theses applications and functions for small, personal, battery-powered computers.

There are some ways that battery life may be extended or optimized. For example, power-management techniques may extend battery life by 1.5, use of low-power integrated circuit technology can add another 1.5, sophisticated electrical storage technology another 1.5, and solar recharge perhaps another 1.2. The net multiplier, using every means of help is about 5, so a 500 g battery will then power such a computer for about three hours. Five hours is still a relatively short battery lifetime, so sophisticated operations for small, portable computers, such as World Wide Web (WWW) browsing on the Internet, are not, until the time of the present invention, very practical.

Further to the above discussion, as the global network of connected databases known as the World Wide Web continues to grow, social and political concerns grow as well. Many are concerned that the expense and complexity of end-use computers suitable for Web browsing is a formidable barrier to increased information access by disadvantaged millions, for which Web access may be seen as a tool for empowerment and social and political advancement.

What is clearly needed is apparatus and methods whereby sophisticated operations like Web browsing and the like may be accomplished with small, battery-powered portable computers, such as hand-held computers, while also accomplishing a life-between-charges of a week or more, without requiring especially heavy batteries.

SUMMARY OF THE INVENTION

In a preferred embodiment of the invention a computing system is provided comprising a field computer comprising a display having a specific size and resolution; and a Proxy-Server connected to the field computer by a data link, the Proxy-Server having an Internet port. The Proxy-Server is adapted in this preferred embodiment to access Internet servers through the Internet port directed by commands and data received from the field computer, to download data from the Internet servers thus accessed, to transpose the downloaded data by reducing information density, and to transfer the transposed data to the field computer via the data link in a Transfer Control Protocol/Internet Protocol (TCP/IP) format.

A particular advantage in embodiments of the invention accrues in use of portable computers powered by electrical storage cell systems, such as by batteries of various sorts. In these embodiments functionality to battery life is significantly extended. Hand-held computers with computing power lower than one-hundred thousand instructions per second can be apparently fully functional Internet browsing tools, while enjoying battery life between charges of as much as two weeks, or more.

In various embodiments of the invention the Proxy-Server downloads data comprising Web pages and transposes the data to match the specific size and resolution of the display of the field computer. The Proxy-Server may also accomplish caching functions in handling data from the Internet to a field computer coupled to the Proxy-Server.

Also in some preferred embodiments of the invention, when a field computer makes a data link with a Proxy-Server adapted according to embodiments of the invention, the field computer transfers to the Proxy-Server information particular to specific characteristics of the field computer, such as the size and resolution of the display of the field computer. The Proxy-Server then uses this information in transposing data for transfer to the field computer.

Various data links known in the art may be used for coupling field computers, such as battery-powered portable units, to a Proxy-Server according to embodiments of the invention. Among these links are telephone modems, both analog and digital, and cordless connections of various types.

Elements of the invention in various aspects can be provided separately to be generally compatible in operation. For example, Proxy-Servers adapted to perform the browsing and data transposing functions of embodiments of the invention, and adapted to transmit transposed files to connected field computers can be provided without adapted field computers. Moreover, field computers can be provided for end-users adapted for operation with Proxy-Servers, but may be provided separate from Proxy-Servers. Many existing computers, including those types generally known as personal organizers, digital assistants, and the like, may be adapted to cooperate with Proxy-Servers according to embodiments of the invention.

Further to the above, various items of software can also be provided according to and compatible with hardware devices and systems independently of the hardware devices and systems.

In practicing the invention, one's adapted personal computer is coupled to a Proxy-Server over a data link such as a telephone modem, and may, according to an aspect of the invention, transfer specific information, such as the type, size, and resolution of the personal computer's display, to the Proxy-Server. The Proxy-Server may then browse the World Wide Web according to instructions received from the personal computer, transpose files downloaded from the Web into a form quickly and easily usable by the personal computer, and transmit the transposed data to the personal computer for display. Very large files may become fewer files, and much smaller files in the transposition.

There are many benefits to be expected from practicing various embodiments of this invention. For example, low-end, hand-held computers, including such units known generally as personal organizers and personal digital assistants (PDAs), now become fully-functional Web browsers. This effect alone extends the use of the Web dramatically to people and institutions that might otherwise be excluded from the exponentially growing body of human knowledge available. The benefits extend to schoolrooms as well as to the homes of potential users. Accessibility is also significantly advanced for cultures and countries where such technology might not be available soon, or ever. There are many such social and cultural benefits. In addition, there are the clear benefits of power-saving, produced by the very efficient use of computing power at the Proxy-Servers of the invention, rather than at the computers in the field.

In addition, combination designs of televisions and computers, which are just being offered at the time of this patent application, could benefit from incorporation of features of this invention, wherein much of the computing load could be carried by a Proxy-Server, allowing simplicity and lower-end CPUs to be used at the TV apparatus. In alternative embodiments, computing power no longer needed could be used for other tasks, such as providing a soft-modem. Reduced file size in such applications will also provide faster loading, which will be important for some time to come, because analog phone lines will continue to be the principal carriers in the near future.

BRIEF DESCRIPTION OF THE DRAWINGS

FIG. 4 is a second part of the exemplary session script for which FIG. 3 is a first part.

DETAILED DESCRIPTION OF ILLUSTRATIVE EMBODIMENTS

Figure 1:
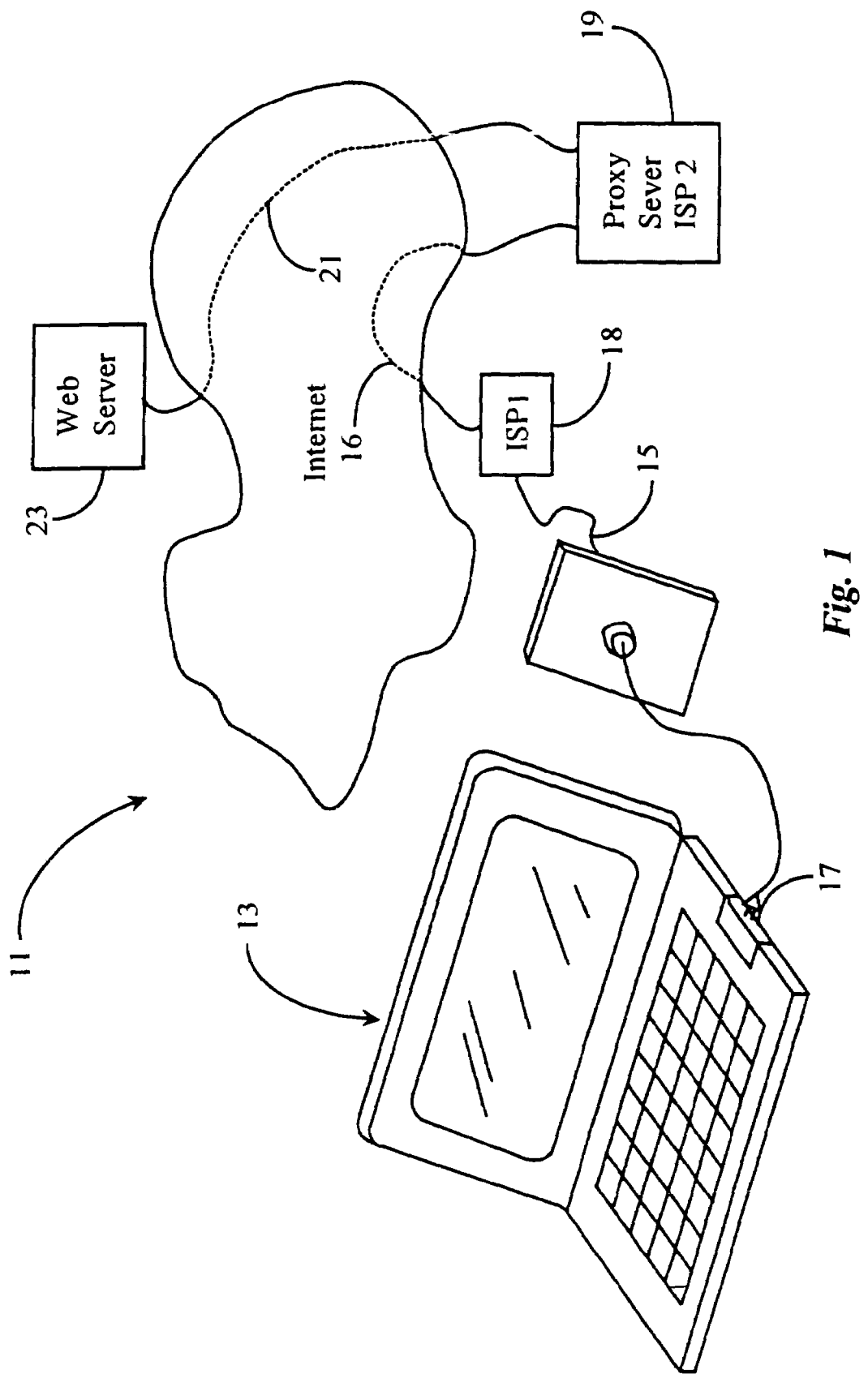
FIG. 1 is a largely diagrammatical illustration of a Proxy-Server system according to an embodiment of the present invention.

FIG. 1 is a largely diagrammatical illustration of a computing system 11 according to an embodiment of the present invention. In this embodiment a hand-held computer 13 is connected via a telephone line 15 through a modem 17 to a first dial-up point 18, which may be an Internet Service Provider. Accordingly, dial-up point 18 is labeled ISP 1. In this arrangement a Proxy-Server 19 according to an embodiment of the present invention is established as a server on the Internet, and a command from unit 13 to ISP 1 results in connection through a TCP/IP pipe 16 to Proxy-Server 19. Proxy-Server 19 is labeled ISP 2, for Internet Provider 2. Proxy-Server 19 has links to other Web servers on the Internet as is known in the art, and may open TCP/IP paths 21 to any such Web server 23.

In alternative arrangements, connection may be by modem from unit 13 directly to Proxy-Server 19. Alternatively, Proxy-Server 19 may be a node on a LAN at a corporate system. In all cases of embodiments of the invention, communication from unit 13 to Web servers 23 on the Internet is through Proxy-Server 19.

In this embodiment hand-held computer 13 is a high-end personal organizer, such as a Sharp Wizard™ personal organizer. The hand-held computer, however, can be any one of a large number of commercially available computing devices with a broad range of capabilities, including those devices known as personal digital assistants (PDAs). In other embodiments and aspects of the present invention, the computer used by a person to access and interact with the Proxy-Server in practicing the present invention need not be a hand-held, or even a portable computer in the sense the terms are used in the art. In some aspects, capabilities of a field unit according to the present invention are built into a set-top box for a TV system or directly into a TV set.

Most computers capable of modem communication can serve to practice the invention, and, in the following discussion, the terms field computer or field unit are used to generally indicate a computer used anywhere for primary Internet access, whether through and in cooperation with a Proxy-Server according to an embodiment of the present invention, or not.

Even though the present invention is not limited to hand-held, battery-powered computers, but is applicable to personal computers of all types, the techniques of the invention are particularly advantageous when used with portable, battery powered devices as field units, because they provide a way to accomplish relatively sophisticated computer operations with low-end, low-power CPUs. This technique is particularly effective in saving power relative to functionality, which provides greatly extended battery life.

Returning to FIG. 1, in this arrangement, computer 13 has a modem 17, and is connected via phone lines 15 to a Proxy-Server 19, as described above, such as through a first dial-up point. This connection is convenient, but not required. There are a number of other ways computer 13 may be connected to the Internet, or to a similar Proxy-Server without telephone lines, such as by a satellite link or cable modem, or by a combination of data links. Also, the modem shown may be a built-in modem or an external modem, and may also be either an analog modem or a digital link such as an Integrated Services Digital Network (ISDN) modem.

Proxy-Server 19 in this arrangement is unique. In a conventional system, proxy-servers, if used at all, are used only for caching and security. In embodiments of the present invention the Proxy-Server performs much of the computing that computer 13 would otherwise be obliged to perform. Proxy-Server 19 and its functionality with computer 13 is described in more detail below.

Figure 2:
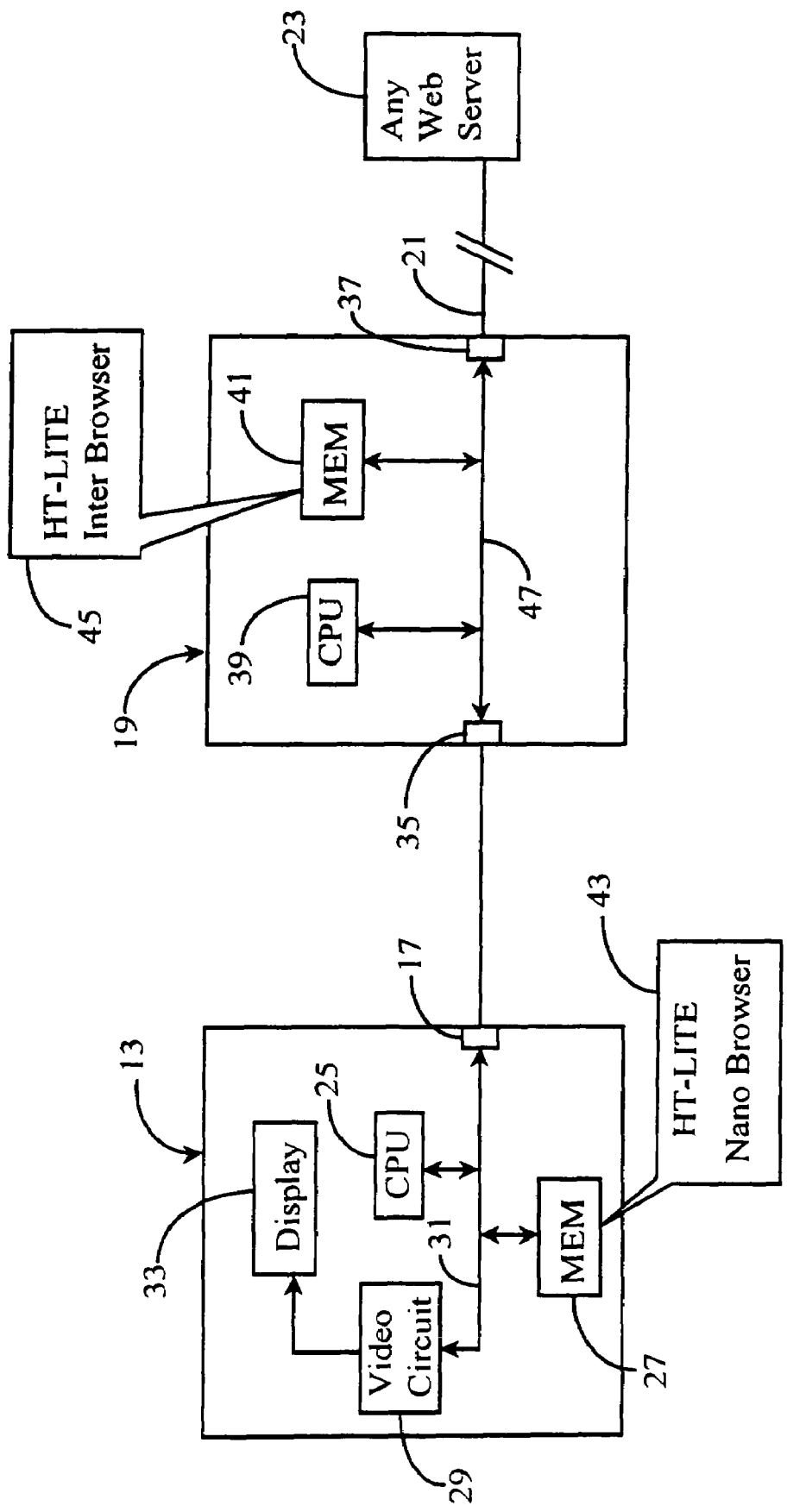
FIG. 2 is a diagram of a portable computer and a Proxy-Server from FIG. 1, showing additional detail.

FIG. 2 is a diagrammatical illustration of hand-held computer 13, Proxy-Server 19, and WEB server 23 from FIG. 1 showing additional detail. In FIG. 2, computer 13 is shown connected directly to Proxy-Server 19, but could be connected by a number of ways, as is described more generally above.

Computer 13 has a CPU 25, a memory 27, video adapter circuitry 29, and modem 17 all communicating on bus 31. Video circuitry 29 drives a display 33. Memory 27 may be any of a number of types, such as flash, random access (RAM), read-only (ROM) or similar type, or a combination of these. There may be other components as well, but these are not shown to facilitate description of the unique aspects of this embodiment of the invention. The hardware arrangement is intentionally shown as general, and is meant to represent a broad variety of architectures, which depend on the particular computing device used.

Proxy-Server 19 is a relatively sophisticated and powerful computer typical of computers used as WEB servers, although the use in this embodiment of Proxy-Server 19 is not the conventional or typical functions of a WEB server as known in the art. Proxy-Server 19 has a CPU 39, a memory 41 and a means of connecting to a network. The network connecting means in this embodiment is a modem 35 communicating on a bus 47. In other embodiments the network connecting means may be a network adapter or other.

Modem 35 in the embodiment shown is compatible with modem 17 in computer 13. In other embodiments link 15 may be of a different sort, and connection may be made through a dial-up point as shown in FIG. 1. A communication port 37 connects to communication link 21 (FIG. 1), providing communication with conventional WEB server 23, which represent any WEB server that may be accessed on the World Wide Web.

Port 37 and link 21 may be any of several types. In some embodiments, server 23 and server 19 will be nodes on a local area network (LAN), and the link between the two servers will be a serial network link with port 37 being a LAN card according to any of a number of well-known protocols. In other embodiments link 21 may be another telephone line, and port 37 will be a telephone modem. In still other embodiments, this link could be a parallel communication link.

Proxy-Server 19 exists in this embodiment of the invention to perform functions enabling hand-held computer 13 to operate as an apparently powerful web-browsing machine, even though the stand-alone capability of computer 13 will not even begin to support such functionality. As is well-known in the art, for a computer to be a fully-functional web-browsing system requires a high-performance CPU and execution of relatively sophisticated web-browsing and display applications. Such a computer typically has to operate, as described above, at or above a million instructions per second.

In the embodiment of the present invention shown by FIGS. 1 and 2 Proxy-Server 19 executes a program 45 the inventor terms an InterBrowser. The InterBrowser combines functionality of a conventional web browser with special functions for recognition of and communication with hand-held computer 13. Commands from computer 13, such as, for example, a command to access a WEB page on the World Wide Web, are received by Proxy-Server 19 operating the InterBrowser program, and acted upon as though they are commands received from a conventional input device such as a keyboard.

Following the example of a command communicated over link 15 from computer 13 for accessing a WEB page (typically a Universal Resource Locator (URL), Proxy-Server 19 accesses the appropriate server (in this case server 23) over link 21, and downloads the appropriate data over link 21. Proxy-Server 19 therefore has HTML and TCP/IP capability, and typically has access to and capability of executing a host of other routines as known in the art for supporting WEB browsing and accessing data through the World Wide Web. These routines and this functionality are all very well-known to those with skill in the art.

Proxy-Server 19, instead of displaying the downloaded data (or playing video and/or audio output, as the case may be, depending on the downloaded data), translates the data to a simpler communication protocol and sends the data to computer 13 for output over link 15 in a TCP/IP protocol. Link 15 becomes a dedicated TCP/IP pipe to and from Proxy-Server 19. Proxy-Server 19 thus acts as a proxy for computer 13, performing those functions of WEB browsing computer 13 cannot perform.

Computer 13 through execution of a program the inventor terms a NanoBrowser 43 sends commands entered at computer 13 over link 15 to Proxy-Server 19 and accepts data from Proxy-Server 19 to be displayed on display 33. Data is transferred in a protocol the inventor terms HT-Lite. The NanoBrowser also provides for interactive selection of links and entry into fields in displays, as is typical for WEB pages displayed on a computer screen. The NanoBrowser provides for accepting such entry, packaging data packets in TCP/IP form, and forwarding such data to Proxy-Server 19, where much greater computer power provides for efficient processing.

In conventional WEB browsing, all final processing takes place at the browser's computer, and those who establish WEB servers assume that browser's will operate with sufficiently powerful equipment and programs to accomplish all of the necessary processing. No such processing is done at the WEB servers.

One of the processing tasks that has to conventionally occur at the browser's computer is processing of received data into a format to be displayed on whatever display the user has. There are, as is well-known in the art, many types of displays and many display modes. These range all the way from relatively crude LCD displays to high-resolution, multi-color displays. There are, in addition, a number of other functions that have to be performed conventionally at a user's computer to interact effectively with the WWW. For example, audio and video and some other functions typically require supplemental, or helper, applications to be installed on or downloaded to a field unit to process audio and video data and the like.

Most data transferred by WEB servers assumes relatively high-end displays, such as color SVGA displays as known in the art. In PDAs and digital organizers, such as those anticipated for use in the present invention, the displays are relatively low resolution, and are typically LCD in nature. In the system described with the aid of FIGS. 1 and 2 InterBrowser program 45 at the Proxy-Server and the HT-Lite Nano-Browser program at the hand-held unit cooperate in another manner as well. When one connects to the Proxy-Server the hand-held unit, through the HT-Lite NanoBrowser program, provides a signature which the Proxy-Server compares with logged signatures.

An ID match when connecting a hand-held unit to the Proxy-Server provides the Proxy-Server with information about the hand-held unit, such as CPU type and power, screen size, type and resolution, presence of a pointer device, and sound capability. The Proxy-Server then uses this specific information to translate HTML and other files from the Internet to a form readily usable without extensive additional processing by the hand-held unit. For a small monochrome LCD display a 60 k/70 k JPEG file becomes a 2 k/4 k bit map, for example. Also, multi-file pages are recombined into single file pages. This translation also minimizes bandwidth requirement for link 15, and speeds transmission of data.

It is in this ability of the Proxy-Server to do the heavy computing, of which the translation of HTML files is a single example, that is responsible for a unique ability of hand-held devices in practicing embodiments of the present invention to accomplish functions that they could not otherwise accomplish, and to do so without inordinate usage of stored energy. In various embodiments of the present invention, hand-held devices with CPUs having an ability to run at from 0.001 to 0.05 MIPs can serve as WEB browsers, displaying WEB pages and allowing users to initiate on-screen links and to input data into input fields. Given the above example of MIPs requirement for WEB browsing, where currently available solutions may provide a 5× advantage, practicing the present invention can provide an advantage of up to 2000×, resulting in battery life approaching 2 weeks (given a 100 g battery weight), where expected battery life for similar functionality with a powerful CPU was calculated as 8 minutes.

There are many functions other than simple WEB browsing that are desirable for a hand-held devices like those contemplated to be used with systems according to embodiments of the present invention. The typical functions for digital organizers and PDAs, for example, such as scheduling of appointments, listing phone numbers, addresses and the like, taking notes, sending faxes and E-mail and so forth, and such tasks as currency conversion, are still provided by a hand-held unit executing HT-Lite. Now, however, these functions are more interactive than previously, as data for these functions can be exchanged through the TCP/IP link with the Proxy-Server, which may access data from a variety of sources to update data for such functions.

In a preferred embodiment of the present invention a variety of Groupware functions are supported, wherein a database having variable data such as appointment schedules for employees may be accessed from several different points, such as from a computer at home, a computer on a network at the office, and a hand-held computer in the field, through a Proxy-Server connection. In such interactive circumstances, date and time monitoring may be used so files in different locations may be updated when connection is made between units having different versions of a file. Also, access may be provided selectively, so, if preferred, only certain persons may have access to certain files. For example, one user could grant another access to his or her appointment schedule, such that one could make an appointment for oneself on another's appointment schedule.

To practice the invention, given an accessible WEB server configured as a Proxy-Server according to an embodiment of the present invention, one needs only to load HT-Lite Nano-Browser software on a computer and to provide Internet access for the computer, such as by a telephone modem. In many cases, candidate computers have built-in modems. In other cases, an external modem may be provided and connected. In the case of hand-held devices, such as PDAs and organizers, some have an ability to load software via a serial port, a PC card slot, through the modem extant or provided, or by other conventional means. In some cases, all operating code is embedded, that is, recorded in read-only memory. In some of these cases, adding HT-Lite routines may require a hardware replacement. In virtually all cases of hand-held devices, however, the necessary routines can be provided.

One of the components of the HT-Lite NanoBrowser software is a minimum browser routine termed by the inventor a NanoBrowser. The NanoBrowser is capable of exerting a URL over the modem connection to access the Proxy-Server. Theoretically, one could exert a URL of a WEB site other than the Proxy-Server, but the result would be an unusable connection, as the small hand-held unit would not be able to handle the sophisticated data provided to be downloaded.

Connection to the Proxy-Server provides the Proxy-Server with information as to the subscriber and the subscriber's equipment. These operations proceed in a manner well-known in the art for such log-on and security transactions. Once access is extended to the user, an interface is provided for the user to browse in a manner very similar to well-known WEB interfaces. That is, the user's display provides an entry field for a URL which is asserted by an enter key or the like. There may also be an address book for often-visited sites, as is common with more powerful machines.

Developers are quickly introducing new and useful features for WEB browsing, such as an ability for users to access electronic documents through access to their own WEB pages, machine-independently. All such features will be available in the practice of the present invention, as there is nothing in the invention that inherently restricts use more than the use of more powerful machines.

Similarly, there are no strict requirements for the location of the Proxy-Server or of accessible WEB servers in embodiments of the present invention. No restrictions are placed on such locations beyond restrictions on servers in general. In one embodiment, a corporation with multiple and perhaps international locations may have a local area network with one or more Proxy-Servers, and employees, particularly those employees whose job functions require travel, are provided with hand-held digital assistants according to an embodiment of the present invention. Multiple functions are then provided over Internet connection in Internet protocol, far beyond what could otherwise be provided with small and inexpensive units; and battery life would be far beyond what would otherwise be expected.

Figure 3:
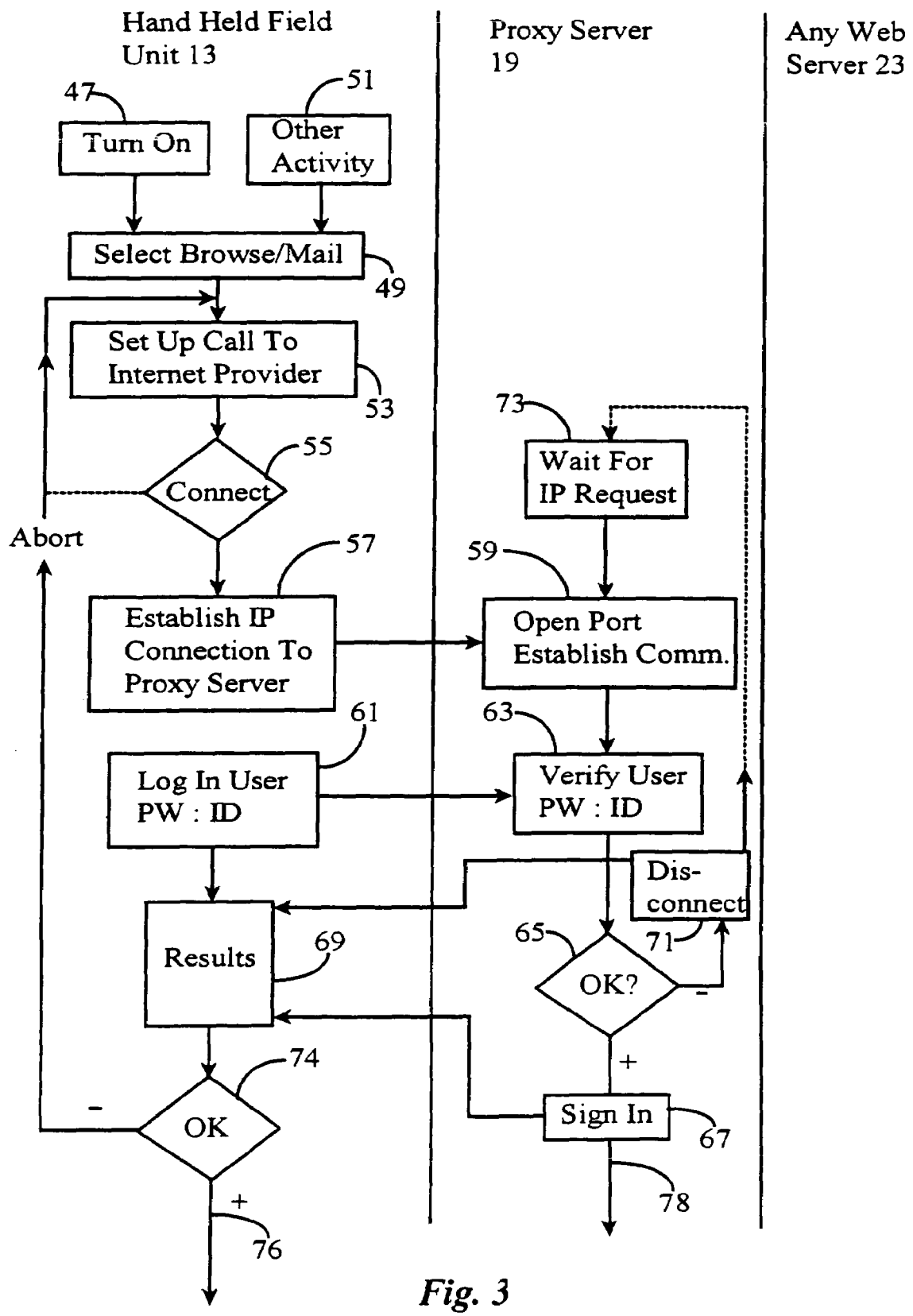
FIG. 3 is a diagram showing a first part of an exemplary session script between a hand-held computer, a Proxy-Server, and a Web server according to an embodiment of the present invention.
Figure 4:
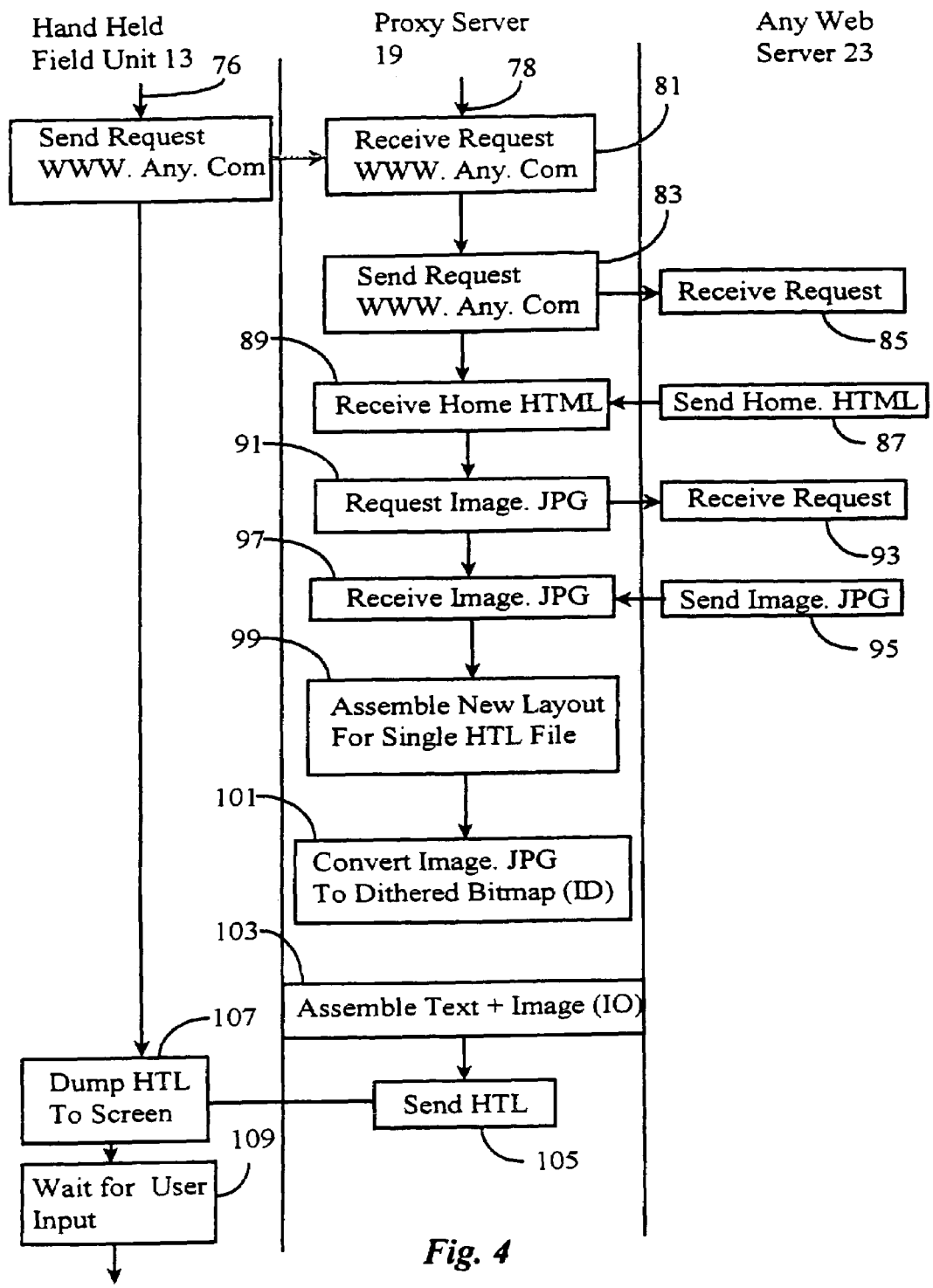

FIGS. 3 and 4 together form an example of a session script between hand-held computer 13, Proxy-Server 19, and any WEB server 23. These figures are used herein to describe important functions of the NanoBrowser incorporated in computer unit 13, and the InterBrowser, incorporated in Proxy-Server 19, as well as to illustrate methods in practicing the present invention.

Referring first to FIG. 3, the figure is divided generally into three columns (as is FIG. 4), one for functions performed at computer field unit 13, a middle column for functions performed at Proxy-Server 19, and a third column for functions performed at WEB server 23.

At step 47 a user turns on the hand-held computer. It is assumed at this point that a data link is established between the hand-held and Proxy-Server 19, which is represented in FIG. 3 and in FIG. 4 by the boundary between the left column and the center column. As previously described, this interface can be of any convenient sort, such as an analog telephone modem. After the hand-held performs a simple boot-up process, a menu is presented to the user. One of the selections (by virtue of the NanoBrowser software) is Browse/Mail.

At step 49 the user selects Browse/Mail. Other functions of the hand-held, that may be fully supported without connection to a Proxy-Server, such as appointment scheduling and phone lists, are not represented here, except by the general step 51 labeled "Other Activity". There may be other menu selections, and the Browse/Mail selection is exemplary. Initiation of communication with the Proxy-Server could be accomplished in other ways.

Routines in the NanoBrowser respond to the Browse/Mail selection by presenting the necessary interface for the user to access his/her subscribed Internet provider. At step 53 this interface is presented and the user makes the necessary inputs to establish the provider connection.

The present example assumes connection and operation through an Internet provider, wherein the subscriber's status is that of a Proxy-Server subscriber, although this is not the only arrangement within the scope of the invention. Employees of a corporation might, for example, log on to a server on a company network.

Connection to the Internet provider is made at step 55. At step 57 action is taken to establish an Internet Protocol (IP) connection to a Proxy-Server according to the present invention. Initial communication from the connected hand-held causes the Proxy-Server to open a port and establish the connection at step 59.

At step 61 the user logs on by entering a user name and password and the field unit identifies itself with its ID. At step 63 the Proxy-Server compares the entered password and ID with stored records, and derives a signature for the unit. At step 65 the Proxy-Server decides whether the information is correct. If the Log-On is valid, control passes to step 67, and the Proxy-Server acknowledges the successful log-on to the hand-held unit at step 69. If the log-on is not valid, control in the Proxy-Server goes from step 65 to step 71, and the Proxy-Server disconnects from the hand-held unit. The Proxy-Server then waits for a new ID request (step 73).

At the hand-held unit, assuming an unsuccessful log-on, control passes from step 74 back to step 53, and the user is provided another opportunity to log on. Control continuity from the hand-held unit to further steps in FIG. 4 is indicated by line 76. For the Proxy-Server the control continuity to FIG. 4 is indicated by line 78.

Referring now to FIG. 4, which is a continuation of FIG. 3, continuity lines 76 and 78 are shown at the top of the figure. Following the activity at the hand-held, at step 79 a request is sent from the hand-held (after having been entered by the user) to access a page on the WWW. This request is represented by the URL WWW.Any.Com, which can be any valid Universal Resource Locator (URL) for the Internet.

At step 81 the Proxy-Server receives this request. The proxy server processes the request from the hand-held and at step 83 issues a new request through its own full-service browser, through its connection to the Internet, to access WWW.Any.Com. At step 85 the WWW server at WWW.Any.Com receives the request from the Proxy-Server and at step 87 sends its home page HTML file, represented as Home.HTML, to the Proxy-Server.

At step 89 the Proxy-Server receives Home.HTML. Home pages typically contain at least one image file, which in many cases is a JPG file. Accordingly, at least two files must be downloaded to display a home page. At step 91 a request for a JPG image file is sent by the Proxy-Server 19. The web server 23 receives this request at step 93 and sends the image file to the Proxy-Server at step 95. The Proxy-Server receives the image file at step 97. There may be many more files than this, but a minimum representation has been made for simplicity in description.

At step 101 the Proxy-Server converts all of the .jpg files to a dithered bitmap format according to information associated with the user ID received from the hand-held at log-on. This ID establishes the size and resolution of the hand-held's display, for example, and the bitmap created from the .jpg files is scaled to the hand-held's display.

Once all the files in the Home page script are downloaded from the accesses Web server at WWW.Any.Com, the Proxy-Server assembles all of these files into a single HT-Lite (HTL) file for transfer to the hand-held. This process is represented by step 103. At step 105 the new HTL file is transmitted to the hand-held unit. The hand-held receives at step 107 the single HTL file prepared from the several HTML files received by the Proxy-Server. Finally, at step 109 the hand-held awaits new user input, such as, for example, a request to jump to a related page.

As has been described above, field computers of many sorts may be used for connecting to the Internet through a Proxy-Server according to embodiments of the present invention, although there are particular advantages in using small, inexpensive, battery-powered, hand-held field units. As has also been described, information relating to the field unit used by each subscriber is recorded at the Proxy-Server (or available to the Proxy-Server), and, upon connection, the Proxy-Server accesses this information, and uses it in transposing files for a particular unit.

In some cases, a display used by a field unit will be large enough to display an entire page from the WWW. In other cases, it will be preferable to present just a part of an entire page, because the display of the field unit may be too small to provide an entire page with adequate resolution. In these cases it will be necessary to zoom and pan to see an entire page. In one embodiment of the invention a field unit is provided with an auxiliary small display, to present information relative to the position on a page that may be presented on the main screen, as an aid in panning to other parts of the page.

It is well-known that graphic information is not the only information accessible on the Internet. Audio may be downloaded in many cases as well. In many cases where audio is available, software, often termed a "media player" is provided to be downloaded from the same source to be used by the connecting computer in processing the audio data. The present structure of the Internet WWW is such that users are assumed to have certain kinds of equipment of sufficient computing power to do Web browsing and to operate media players. For example, media players are typically provided for IBM-compatible PC, Macintosh, or Sun systems.

In many embodiments of the present invention, wherein field units of much lesser power than the present assumptions may be used, these assumptions are no longer valid. Many field units which may now, with the unique capabilities of Proxy-Servers according to embodiments of the present invention, be used for browsing the WWW, will not be capable of executing the typical media players.

As has been described above, subscribers to a Proxy-Server system according to the present invention will provided characteristics of their particular field units to the Proxy-Server, and the Proxy-Server will use the information in transposing files. The same is true for audio, so the Proxy-Server will "know" if a particular field unit has a speaker system, and what the computing capability of the field unit is. In alternative embodiments of the present invention, field units will be provided with capability to receive Linear Predictive Coded (LPC) audio data, and to drive one or more speaker units. The Proxy-Server, in these cases, will either download the media players as necessary, or be previously programmed with media players, and will convert the audio data downloaded from the Internet to the form usable by the field units as a part of the overall transposing process.

In some aspects of the invention specialized field units are provided for special purposes. A hand-held computer is provided, for example, with a CPU, a ROM having embedded NanoBrowser software, a main display, and an auxiliary display for indicating page position for panning and the like. In some variations, a microphone and a speaker are also provided, and the on-board software includes routines for processing audio in both directions, to and from the Proxy-Server. In other variations a digital camera apparatus is provided with the hand-held unit, and a user can snap digital pictures and send the data to the Proxy-Server or to any other machine on the Internet by E-mail. In combinations of these variations very useful systems are provided for field operatives of such as insurance companies to do field work.

Other field units are provided in alternative embodiments as desk units for school environments, having many or all of the features of the hand-held units described, but taking the form of desktop units with conventional power supplies rather than batteries. Such units can be made with considerably lower complexity and cost than units conventionally capable of interacting with the Internet, providing much expanded Internet access for school systems and the like. These units incorporate NanoBrowsers according to embodiments of the present invention.

Another form of field unit according to the present invention is a TV-type unit having a low-end CPU and embedded NanoBrowser software according to an embodiment of the present invention. Home TV-computer technology may thus be provided through a Proxy-Server connection at a cost very much below currently available systems. Such units will also be attractive for use in hotels, as they expand on existing information systems using TV sets in hotel rooms.

In captured corporate systems, properly termed Intranet systems, scheduling, ordering, instructions, travel arrangements, and the like can be extensively interactive. For example, a secretary may access an appointment schedule file using a regular PC connected to the Internet, the schedule for an employee temporarily inaccessible (in the middle of the night in Moscow, for example, while the employee may be sleeping) and make adjustments in the employee's appointments. When the employee next establishes contact with the Proxy-Server, the appointment calendar in the employee's unit is compared by date and time stamp, and automatically updated as necessary, following preset rules for conflict resolution.

An advantage inherent in different embodiments of the present invention is that future improvements in HTML, specific WEB browsing applications, and helper applications need not be installed on the field units used in practicing the invention. Such improvements need only be made in the Proxy-Server. The Proxy-Server can also be updated to do the best translation possible for such improvements.

In an important aspect of the invention, Proxy-Servers adapted to embodiments of the present invention may be provided by commercial Internet providers, thereby providing their customers with extended functionality for small and inexpensive computer units, lowering the expense and complexity typically required of machines that may be expected to access the Internet. In this aspect, customers of such providers could browse the Internet and download and display sophisticated files with existing inexpensive portable computers, personal digital assistants, and digital organizers. This feature promises to dramatically increase accessibility to the Internet, and to lower barriers to entering the Internet world for many people who could otherwise not afford to do so.

Also in embodiments of the invention as incorporated in Proxy-Servers, caching is provided, whereby data downloaded from other Internet servers accessed according to commands entered by users in the field having units connected to the Proxy-Server, may be temporarily stored before or after translation for field units, enhancing viewing speed dramatically at the field units.

It is anticipated that one Proxy-Server may serve a large number of hand-held computers, giving each served computer a functionality far beyond what it could otherwise provide given its power and cost. Current estimates indicate that a single Proxy-Server may serve 100 or more field units simultaneously. Since statistically not all subscribers may be expected to be using their field units at the same time, one such Proxy-Server could serve perhaps 2000 subscribers.

Figure 5:
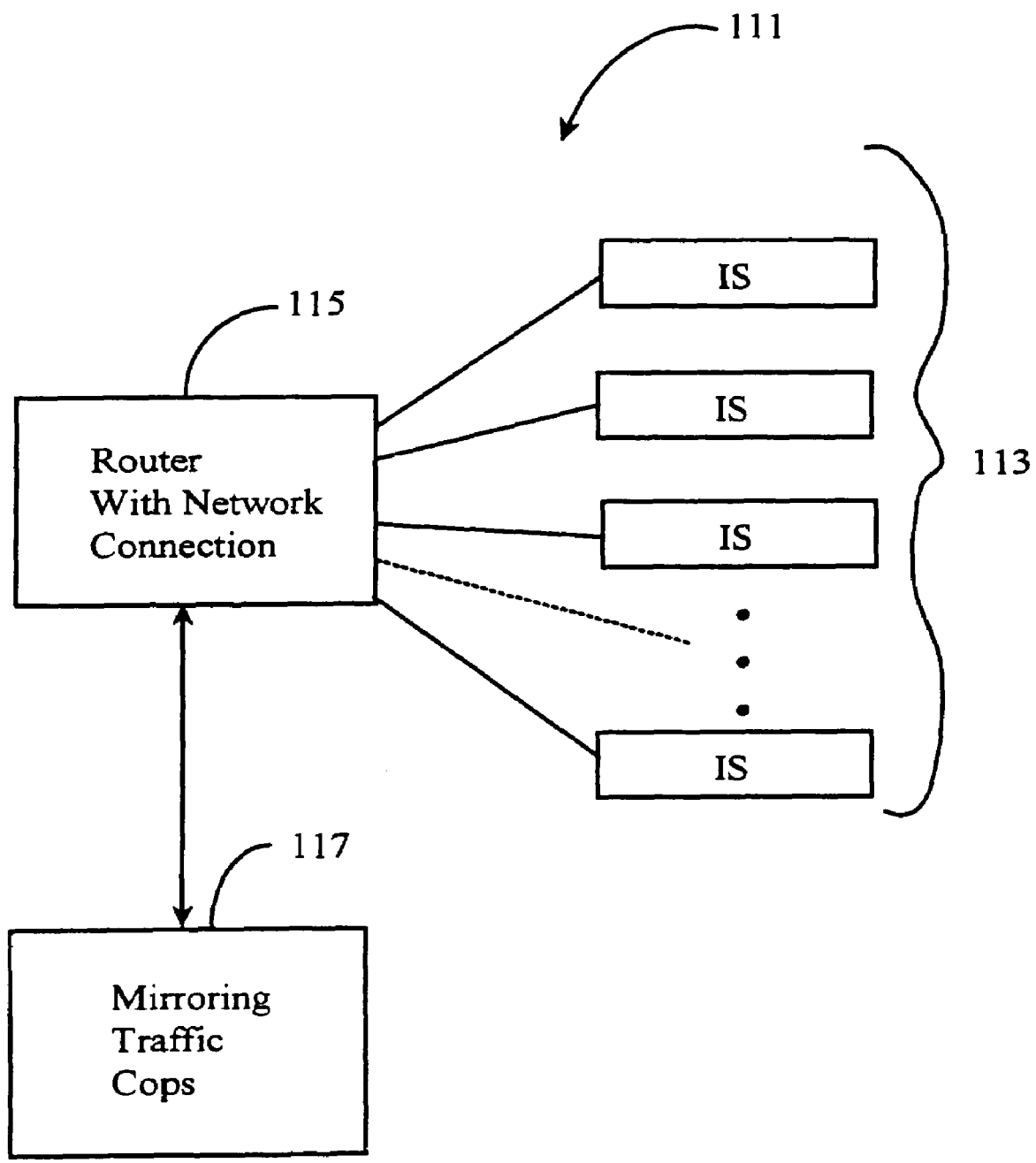
FIG. 5 is a block diagram of an Uninterrupted Matrix of Inexpensive Servers according to an embodiment of the invention.

Even though a single Proxy-Server might be expected to serve a relatively large number of subscribers at the same time, the number of potential users of such a system is very much larger than a single Proxy-Server could be expected to service. For this reason, in a preferred embodiment of the invention, an Un-interrupted Matrix of Inexpensive Servers (UMIS) is provided as a method for implementation for the Proxy Server. FIG. 5 is a block diagram of a UMIS system 111 wherein relatively small, inexpensive servers 113, each with its own hard disks, are interconnected in a network protocol with a router 115 and a mirroring traffic cop server 117. Such a system can handle massive numbers of requests, at a moderate cost, and the system and is scalable and to a high degree fail-safe.

An incoming request is directed to the traffic cop, which is a mirroring system, so that in case one unit fails, the other can take over without interruption. The traffic cop determines that availability and load of all IS's on a regular basis by connecting a requesting a load number (timeout is regarded as failure of that IS), so it can direct requests to the lowest loaded IS. If an IS fails, the traffic cop will learn of it at the next round, and can notify a system supervisor. The load is then shared between the remaining units. Also, a failure of one of the mirroring units triggers a notification to the supervisor. An escalation can be added via e-mail and pagers until proper action is taken.

Ideally the IS units are like drawers that fit into a rack, and have a red light that goes on when and if they fail. This way, service personnel can see immediately which unit needs to be exchanged.

Since there is only transitory data on hard-disks of the IS's, no data recovery is required. In case of open connections, the client's TCP/IP protocol will retry after a time out, and will be directed by the cop to a new IS, thus recovering completely transparently. This way cost per subscriber can be held very low. On the Cop units, since they are mirroring, after an exchange of a defective unit a software routine is started that reconfigures the new unit to be synchronized.

Figure 6:
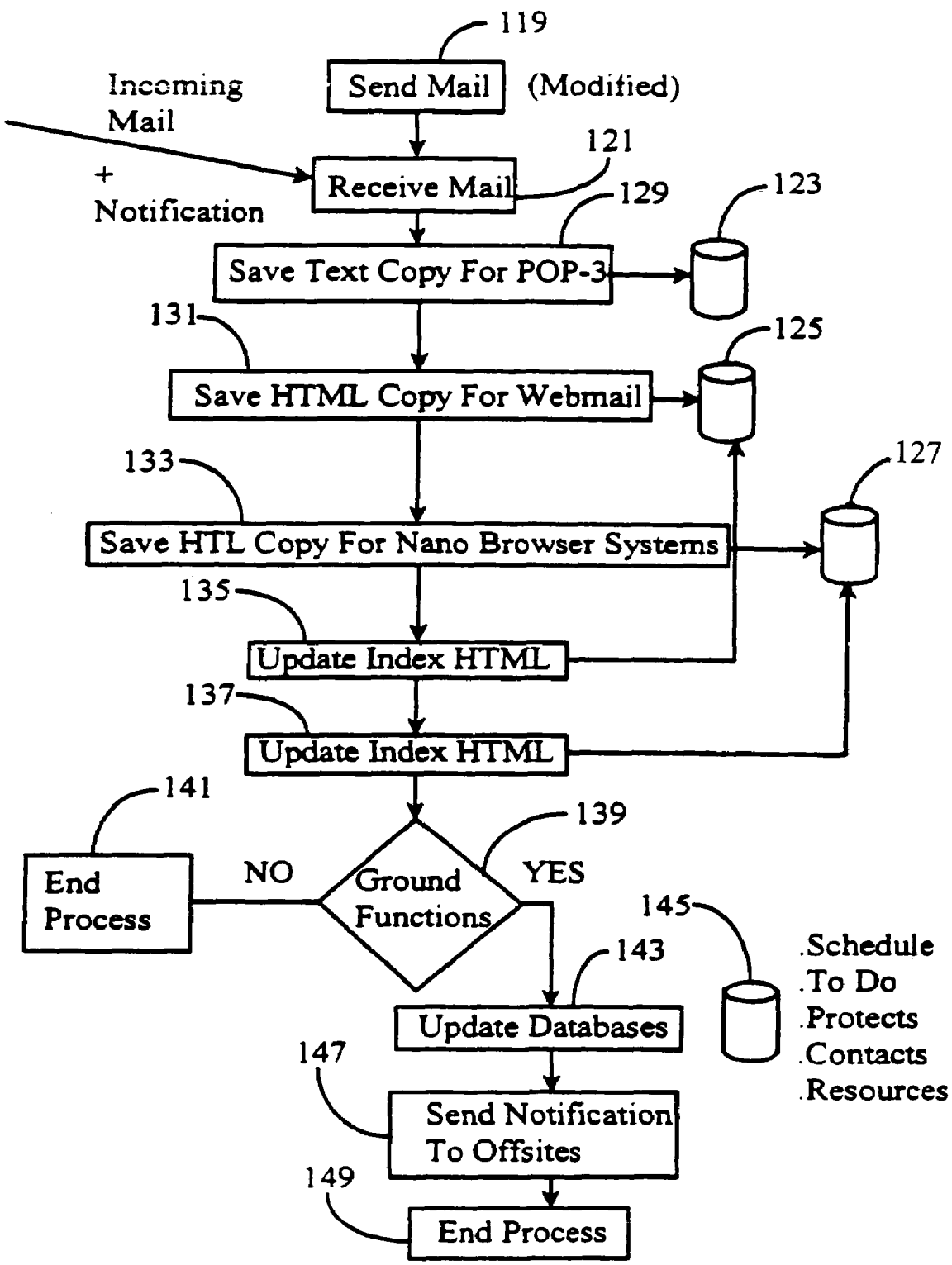
FIG. 6 is a flow diagram illustrating enhanced E-mail and groupware functions according to an embodiment of the present invention.

As was described above, in systems according to embodiments of the present invention, many database functions can be shared with entries, edits and updates made over Internet connections. In addition to database functions, systems according to embodiments of the invention can accomplish enhanced E-mail functions. FIG. 6 is a flow diagram illustrating the nature of such functionality.

The functions illustrated by the flow diagram of FIG. 6 are accomplished by executing software either on a Proxy-Server or at a separate mail server which may be accessed by a Proxy-Server according to an embodiment of the present invention. The routines depicted here are a modified version of SendMail routines known in the art.

In FIG. 6 events for purposes of description begin at step 119. Modified SendMail is active. At step 121 incoming mail is received. In this modified system, there are three file systems 123, 125, and 127 for storing E-mail in different versions. At step 129 a text copy is saved in file system 123 according to Post Office Protocol, revision 3 (POP-30 format, known in the art. At step 131 a copy of the received E-mail entity is saved in HTML format, for WEB mail. At step 133 a copy of the entity is saved in HTL format, compatible with the communication protocol for HT-Lite used between a field unit and a Proxy-Server in embodiments of the present invention.

At step 135 an HTML index is updated. At step 137 an HTL index is updated. At step 139 a discrimination is made as to whether data received is flagged to update a GroupWare database. If not, the process ends at step 141. If so, the appropriate database is updated at step 143 in file system 145. Examples of such databases are an appointment schedule, a ToDo list, a project file, a contacts file, and resumes. There are many more databases that might be updated as well. At step 147 notification of changes in a database are sent to appropriate offsite addresses. The process ends at step 149 until another E-mail message is received.

In the manner shown, E-mail may be shared in the conventional POP 3 manner, sent as HTML with a WEB page, or sent over a TCP/IP pipe as an HT-Lite file directly to a field unit having a NanoBrowser according to the present invention. Moreover, the Internet links may be used to manipulate the scheduling and other GroupWare functions described. Also, the technology disclosed here relative to E-mail and Group-Ware functions can be applied to other massive server functions; it is not limited to the Proxy-Server of the present invention.

In another aspect of the present invention the objectives of the invention may be met without the necessity of having a proxy server between the user's device, such as a hand-held personal computer, and other servers on the world-wide web (WWW).

As was described above in descriptions of some preferred embodiments of the present invention, the unique proxy server accomplishes certain translations and processes that allow quick and efficient integration of data with a user's device. The proxy server, in a preferred embodiment first processes data requested to be transmitted to a specific user's device according to pre-stored characteristics of the specific user's device, or according to characteristics transmitted by the user's device. For example, graphics are processed to provide specific resolution and size according to the specific user's display. Also only multi-media extensions supported by the user's device are used, and data is preferably combined into one file for each transfer. In this manner, each communication with each user's device is done in a fast and efficient manner, tailored to the needs of each user, and the user can then function with a minimum hardware/software device that may be energy efficient providing long life between battery charges.

Figure 7:
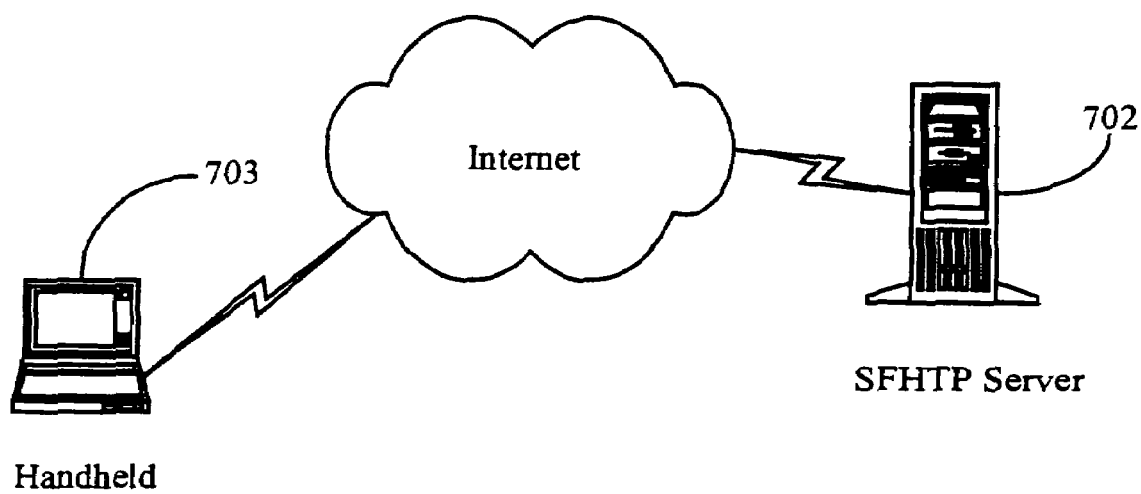
FIG. 7 is an overview illustration of a Web-browsing system according to an embodiment of the present invention wherein a proxy server is not used or needed.

FIG. 7 illustrates an architecture for a system according to an alternative embodiment of the present invention. In this embodiment there is no intermediate proxy server as was described above in other embodiments of the invention, but a server 702 capable of conventional HTTP or HTTPS communication is enhanced to provide an alternative Simplified File Hyper Text Protocol (SFHTP) capability, and this server may then communicate over the Internet with hand-held computers 703 in a manner to significantly enhance communication speed and efficiency. The difference between a conventional server and an SFHTP server according to this embodiment of the present invention is in the control routines.

Figure 8:
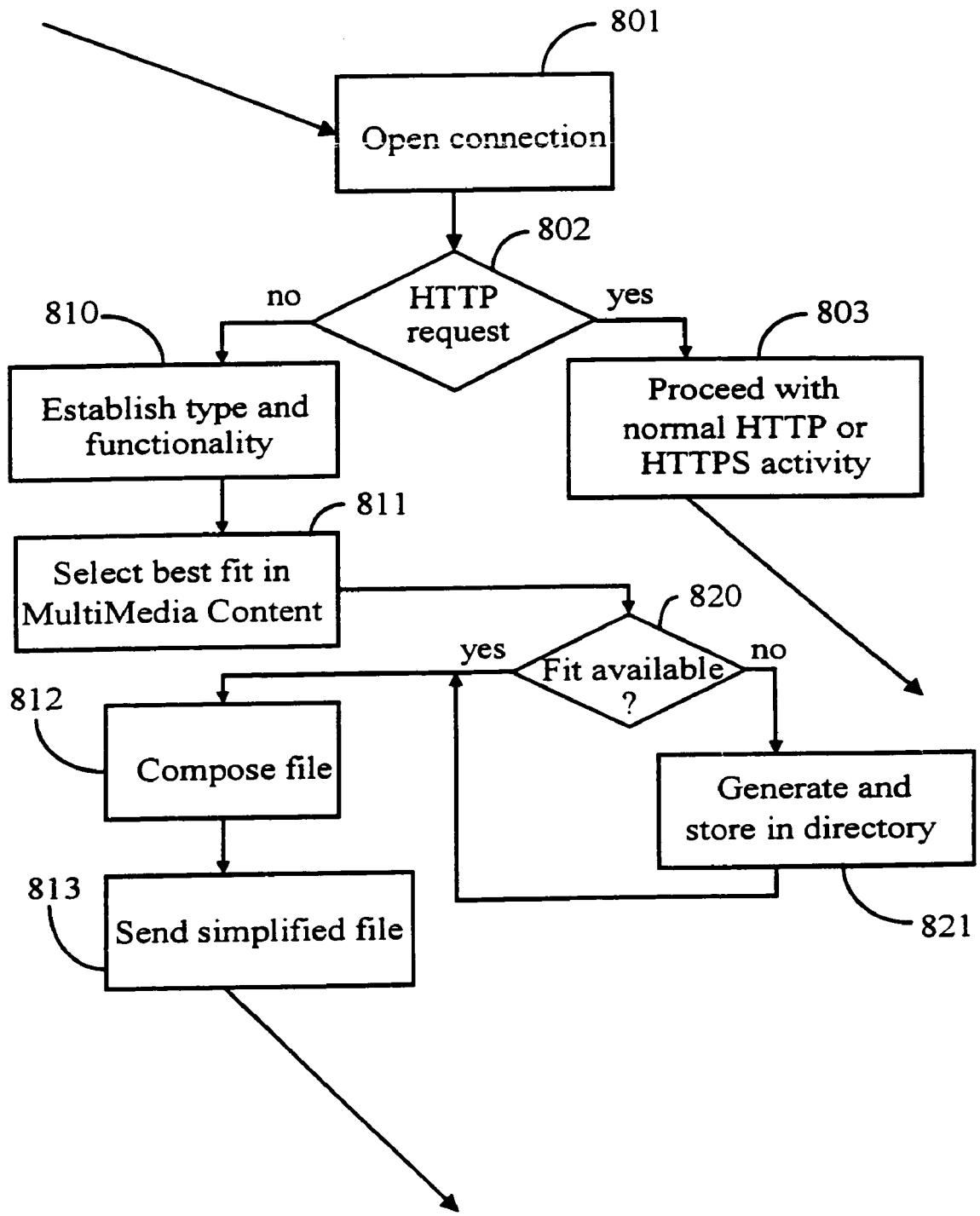
FIG. 8 is a flow diagram illustrating steps in process flow for operations of a server according to an alternative embodiment of the present invention.

FIG. 8 is a process flow diagram illustrating steps followed by a SFHTP-enhanced server according a preferred embodiment of the present invention. A request for service is received at step 801 by a Web Server enhanced according to an embodiment of the present invention. At step 802 the server, through its on-board CPU examines the request. If the request is a conventional HTTP or HTTPS request, control goes to step 803, and processing is according to conventional routines as provided for any conventional HTTP request. If the request, however, is a unique SFHTP request according to an embodiment of the present invention, control is passed to a unique set of control routines beginning with step 810.

The request received may be from a subscriber for SFHTP services or from a conventional subscriber. The difference for a SFHTP subscriber may be accomplished in a number of ways. For example, the request may be tagged by a single additional bit or character, or several additional data bits, in a manner that a conventional server (not enhanced for SFHTP services) will simply ignore or error flag the request. An SFHTP subscriber's usually minimally capable device may proceed to interact with the conventional server, albeit at a greatly reduced speed and with minimum features.

If the request is found at step 802 to be a SFFTP request, at step 810 the type and functionality of the user's device is established. As described above, this may be by matching an ID provided in the request with a list of functionality and characteristics previously provided by the user and stored at the enhanced server, or an interaction may be established wherein the user's device transfers the list of available features to the enhanced server. The list of available features can include such things as screen type, size and resolution; sound options; telephony; credit capabilities (card readers); media players; and the like.

At step 811 the control routines of the enhanced server begin to create the best fit in multimedia content for the requested data according to the user's device capabilities and characteristics. This process includes step 820 wherein the system of the invention determines if a best fit is immediately available. If so, control goes on to step 812. If not, in a preferred embodiment a best fit is generated and stored at step 821, and then control passes on the step 812. In step 821 a graphic is created having the size and resolution of the requesting user's display, and that picture is stored for future use. If the same user or a user having a device with the same display characteristics later requests this picture, it may be retrieved and sent immediately without the need for generating the best fit.

At step 812 a single file is composed using the requested information processed according to the best multimedia fit for the user's device. That file is then transmitted to the user at step 813. Just as described above for other embodiments of the present invention the file transmitted to the user is attuned exactly to the user's needs, and may be directly displayed without heavy software overhead at the user's device, thereby enabling the user to maintain a minimally-configured and powered device.

The single file transmitted to the user contains the data for the static part of a WEB page to be displayed. It may still contain animation, but no new data. It may contain information on opening connections for continuous data type operations, such as telephony, broadcast, video, virtual reality, and so forth. After the file is sent the instant session is terminated. Eventually opened communications may stay open however, until they are closed by either the user of by the server.

It will be apparent to those with skill in the art that there are many variations that may be made in embodiments of the invention as described above without departing from the spirit and scope of the invention. There are, for example, a wide variety of ways different programmers might arrange code to accomplish the purposes described for the invention. Such differences in code do not necessarily constitute distinguishable variations because it is well known that the same results in function, hence method of application, may well be accomplished by a variety of code and/or system arrangements. The range of functions provided at a field unit may also vary widely in different embodiments of the invention, and there are, as described above, many sorts of computer units that will qualify as field units in cooperation with a Proxy-Server according to embodiments of the invention.

In an embodiment, a digital picture system comprises a handheld field unit comprising a digital camera and a server that is communicatively coupled to the field unit. The field unit sends to the server digital picture data associated with digital pictures taken by the digital camera. By way of illustration and not as a limitation, the field unit emails the digital picture data to the server. In an embodiment, the server is communicatively coupled to the Internet, and the server transmits the digital picture data over the Internet.

In another embodiment, the server is communicatively coupled to a second server and sends the picture data to the second server.

In still another embodiment, the server transmits the digital picture data to a client. In yet another embodiment, the server reduces the information density of the digital picture data in accordance with a type and functionality of the client and transmits the digital picture data with reduced information density to the client.

In an embodiment, a handheld field unit comprises a digital camera, a communications port for communicatively coupling the field unit to a server via a network, and a processor. The processor sends digital picture data that is associated with a digital picture taken by the digital camera to the server via the communications port. In an embodiment, the process emails the digital picture data to the server.

In an embodiment, a handheld field unit comprises a digital camera, a communications port for communicatively coupling the field unit to a server via a network, and a processor. The processor processes digital picture data associated with pictures taken by the digital camera and receives digital picture data from the server via said communications port. In another embodiment, the server reduced the information density of the digital picture data in accordance with a type and functionality of the field unit. The digital picture data received from the server has an information density that has been reduced according to the type and functionality of the field unit. In yet another embodiment, the server simplifies a protocol associated with the digital picture data. The digital picture data received from the server is received according to the simplified protocol.

In an embodiment, a server comprises a data port for communicatively coupling the server to a handheld field unit, an Internet port for receiving digital picture data via the Internet, and one or more control routines that determine a type and functionality of the field unit, reduced information density of the digital picture data in accordance with the type and functionality of the field unit, and transmit the digital picture data with reduced information density to the field unit. In another embodiment, one or more control routines also transmit audio data to the field unit. In still another embodiment, the audio data is transmitted to the field unit with reduced information density. In still another embodiment, the one or more control routines simplify a protocol associated with the digital picture data and transmit the digital picture data to the field unit according to the simplified protocol.

In an embodiment, a server comprises a data port for communicatively coupling the server to a client, an Internet port for accessing digital picture data from the Internet, and one or more control routines that simplify a protocol associated with the digital picture data and transmit the digital picture data to the client according to the simplified protocol.

In an embodiment, a server comprises a data port for communicatively coupling the server to a handheld field unit, one or more control routines for receiving digital picture data from the field unit, and an Internet port for providing the digital picture data via the Internet to a client or a second server in response to a data request from the client or second server. In another embodiment, the control routines receive audio data from the field unit. In yet another embodiment, the server comprises stored data identifying the type and functionality of the field unit for processing of future data requests from the field unit. In still another embodiment, the data requests from the field unit comprise an ID for the field unit that is compared by a control routine to IDs stored in the server to determine functionality and characteristics of the field unit based on the ID. In another embodiment, a control routine reduces information density of the digital picture data in accordance with the type and functionality of the client and transmits the digital picture data with reduced information density to the client.

An embodiment provides a method for communicating digital picture data using a handheld field unit comprising a digital camera. A picture is taken with the digital camera. Digital picture data associated with the picture is sent by the field unit to a server.

An embodiment provides a method for communicating digital picture data. Digital picture data associated with a picture taken by a digital camera included in a handheld field unit is received via a network. The delivered digital picture data corresponding to the picture is delivered to a client. In an embodiment, the client is the handheld field unit. In another embodiment, the client is a second handheld field unit. In yet another embodiment, a protocol associated with the picture data is simplified and the delivered digital picture data is delivered to the client according to the simplified protocol. In still another embodiment, a type and functionality of the client is determined and the information density of the digital picture data is reduced in accordance with the type and functionality of the client. The digital picture data is delivered to the client with reduced information density. In another embodiment, the delivered picture data is reduced in resolution compared to the picture taken with the digital camera. In yet another embodiment, the digital picture data is received from a handheld field unit that is communicatively coupled to the network.

An embodiment provides a method for communicating digital picture data. Picture data is received via a network. Delivered digital picture data associated with the received digital picture data is delivered to a handheld field unit having a digital camera.

In an embodiment, a handheld field unit comprises a digital camera for taking digital pictures, a display, and a processor coupled to the digital camera and to the display. The process is capable of displaying the digital pictures in each of a plurality of user-selectable display modes. In an embodiment, a first display mode includes displaying a digital picture with reduced resolution such that the entire digital picture may be displayed on the display. In another embodiment, a second display mode comprises displaying only a portion of the picture and providing a capability to pan around the picture and/or a capability to zoom into or out of the picture.

Other variations within the scope of the invention include hardware variations. There is no strict requirement for a Proxy-Server other than the requirement of executing the InterBrowser program or programs in combination with WEB browsing functions, while maintaining communication with one or more field units and one or more other WEB servers. There are similarly many other variations that will be apparent to those with skill in the art, all within the spirit and scope of the invention.

What is claimed:

1. A digital picture system comprising:
    a field unit comprising a digital camera;
    a data server;
    a proxy server; and
    a client comprising a display, wherein
    the data server is communicatively coupled to the field unit and to the proxy server;
    the field unit comprises instructions for sending to the data server digital picture data associated with a digital picture taken by the digital camera;
    the proxy server is communicatively coupled to the client;
    the client comprises instructions for:
        sending to the proxy server client display data indicative of a capability of the client display to display images; and
        sending requests for digital picture data to the proxy server, and
    the proxy server comprises instructions for:
        storing the client display data;
        receiving a request for digital picture data from the client;
        obtaining the digital picture data from the data server in response to the request for digital picture data from the client;
        transposing the digital picture data to reduce information density of the digital picture data in accordance with the stored client display data; and
        transmitting the digital picture data with reduced information density to the client.

2. The system of claim 1, wherein the field unit further comprises instructions for emailing the digital picture data to the data server.

3. The system of claim 1, wherein the data server is communicatively coupled to the Internet.

4. The system of claim 1, wherein the proxy server comprises instructions for transmitting the digital picture data to the client over the Internet.

5. The system of claim 1, wherein the client display data comprises information selected from the group consisting of a display type, a display size, and a display resolution.

6. The system of claim 1, wherein the client display data is associated with a client identifier, wherein the request for digital picture data comprises the client identifier, and wherein the instruction for transposing the digital picture data to reduce information density of the digital picture data in accordance with the stored client data comprises instructions for:
    comparing the client identifier sent in the request for digital picture data to other client identifiers stored in the proxy server;
    selecting client display data associated with the client identifier sent in the request; and
    transposing the digital picture data using the selected client display data.

7. The system of claim 1, wherein the proxy server further comprises instructions for simplifying a protocol associated with the digital picture data, and wherein the digital picture data with reduced information density transmitted from the proxy server is received by the client according to the simplified protocol.

8. The system of claim 1, wherein the field unit further comprises a microphone and wherein the field unit comprises instructions for sending to the data server audio data received by the microphone.

9. The system of claim 8, wherein the client further comprises instructions for:
    sending to the proxy server client sound data indicative of a functional capability of the client to reproduce sound; and
    sending a request for audio data to the proxy server; and
    the proxy server further comprises instructions for:
    storing the client sound data;
    receiving a request for audio data from the client;
    obtaining the audio data from the data server in response to the request for audio data from the client;
    transposing the audio data to reduce information density of the audio data in accordance with the stored client sound data; and
    transmitting the audio data with reduced information density to the client.

10. The system of claim 1, wherein the client comprises a display and a processor, and wherein the processor comprises instructions for displaying the digital picture data in each of a plurality of user-selectable display modes.

11. The system of claim 1, wherein the client further comprises instructions for displaying the digital picture data with reduced resolution such that the digital picture may be displayed entirely on the display.

12. The system of claim 1, wherein the client further comprises instructions for processing the digital picture data to display a portion of the digital picture and for receiving user input to pan over the digital picture.

13. The system of claim 1, wherein the client further comprises instructions for displaying a portion of the digital picture and for receiving user input to zoom into or out of the digital picture.

* * * * *